United States Patent [19]
Hammons

[11] Patent Number: 5,791,407
[45] Date of Patent: Aug. 11, 1998

[54] REMOTE AND PROGRAMMABLE INDASH DEFROST/COOLING SYSTEM

[75] Inventor: Timothy E. Hammons, Des Moines, Wash.

[73] Assignee: Rapids Defrost System, Inc., Lakewood, Wash.

[21] Appl. No.: 661,843

[22] Filed: Jun. 11, 1996

Related U.S. Application Data

[63] Continuation-in-part of Ser. No. 490,594, Jun. 15, 1995, abandoned.

[51] Int. Cl.[6] .................................................. F25B 29/00
[52] U.S. Cl. .......................... 165/202; 165/266; 165/42; 165/43; 123/142.5 R; 123/142.5 E; 219/202; 219/203; 219/208; 236/51; 62/244
[58] Field of Search ........................ 165/42, 43, 202, 165/266; 123/142.5 R, 142.5 E; 236/51; 237/12.3 C, 12.3 B, 12.3 A, 12.3 R; 219/203; 62/244

[56] References Cited

U.S. PATENT DOCUMENTS

| | | |
|---|---|---|
| 1,727,959 | 9/1929 | Bowen . |
| 2,427,713 | 9/1947 | Caldwell . |
| 3,455,403 | 7/1969 | Hawthorne . |
| 3,870,855 | 3/1975 | Edlund et al. . |
| 3,877,639 | 4/1975 | Wilson et al. ............... 236/51 |
| 3,969,605 | 7/1976 | Danell . |
| 4,274,265 | 6/1981 | Okumura ................... 237/12.3 C |
| 4,436,064 | 3/1984 | Lamkewitz et al. .......... 123/142.5 R |
| 4,575,003 | 3/1986 | Linker et al. . |
| 4,770,134 | 9/1988 | Foreman et al. . |
| 4,823,682 | 4/1989 | Stouffer . |
| 4,866,365 | 9/1989 | Offiler et al. . |
| 4,904,844 | 2/1990 | Chamberlin ................... 219/203 |
| 5,012,070 | 4/1991 | Reed ......................... 219/203 |
| 5,029,662 | 7/1991 | Pena ......................... 219/203 |
| 5,104,037 | 4/1992 | Karg et al. .................... 236/51 |
| 5,187,349 | 2/1993 | Curhan et al. ................. 219/203 |
| 5,222,661 | 6/1993 | Wenhart . |
| 5,265,668 | 11/1993 | Fisher . |
| 5,267,896 | 12/1993 | Petters et al. . |
| 5,284,025 | 2/1994 | Kajitani et al. . |
| 5,285,963 | 2/1994 | Wakefield et al. . |
| 5,350,114 | 9/1994 | Nelson et al. . |
| 5,466,911 | 11/1995 | Spagnoli et al. ............... 219/203 |
| 5,467,522 | 11/1995 | Gold ......................... 219/203 |

FOREIGN PATENT DOCUMENTS

| | | | |
|---|---|---|---|
| WO92/01249 | 1/1992 | WIPO | .............. 237/12.3 C |

Primary Examiner—John K. Ford
Attorney, Agent, or Firm—Townsend and Townsend and Crew

[57] ABSTRACT

A remote and programmable indash defrost/cooling system includes a processing unit coupled to the vehicle's ignition system, heating system, and cooling system. A memory coupled to the processing unit stores a computer readable program which is designed to direct operation of the vehicle's ignition, heating, and cooling systems to allow preprogrammed warming or cooling of the vehicle. The processing unit may also cause the windows of the vehicle to be defrosted and cleaned by starting front and rear defrost systems and then activating the front and/or rear windshield wipers to clear the defrosted ice from the windows.

15 Claims, 3 Drawing Sheets

REMOTE AND PROGRAMMABLE INDASH DEFROST/COOLING SYSTEM

This application is a continuation-in-part of Ser. No. 08/490,594, filed Jun. 15, 1995.

BACKGROUND OF THE INVENTION

The present invention generally relates to vehicle control systems. In particular, the present invention relates to a programmable heating and cooling system for automobiles.

Automobiles are becoming increasingly important in todays society. They are relied on for transportation throughout the year. It is important that they are available for use when needed, despite extreme weather conditions. In northern climes, vehicles can be subjected to very cold weather throughout the winter. This cold weather can damage a vehicle if the temperature is cold enough to freeze the coolant and the engine block. Cold weather also can form ice on the windows of the vehicle, making it impossible to see without scraping or defrosting the windows. An operator, thus, must scrape the windows and warm the vehicle up before it can be safely and comfortably operated. It would be desirable to provide a device which will automatically warm the vehicle and defrost the windows for the operator.

Warm climates can also pose problems for vehicles and operators. Extreme heat can make the interior of a vehicle highly uncomfortable. An operator, typically, must start the vehicle and run it for a period before the air conditioning has a chance to cool the vehicle to a comfortable level. It is desirable to provide a device which would cool the vehicle for the operator without the operator needing to sit in the vehicle.

SUMMARY OF THE INVENTION

Accordingly, a vehicle heating and cooling control system is provided which automatically starts a vehicle to warm or cool it.

The vehicle heating and cooling control system according to the invention includes a processing unit coupled to the vehicle's ignition system, heating system, and cooling system. A memory coupled to the processing unit stores a computer readable program which is designed to direct operation of the vehicle's ignition, heating, and cooling systems to allow preprogrammed warming or cooling of the vehicle. The processing unit may also cause the windows of the vehicle to be defrosted and cleaned by starting front and rear defrost systems and then activating the front and/or rear windshield wipers to clear the defrosted ice from the windows. The result is an automatic and programmable system which starts and warms or cools a vehicle at a preselected time, allowing a vehicle user to safely and quickly get on the road.

Embodiments of the invention employ a control unit with a keypad to select a start time for the system. Further, a remote unit may also be provided enabling a user to remotely enable the system.

Further embodiments of the invention continually monitor the temperature of the vehicle to determine whether there is danger of the block freezing. If the temperature reaches a preselected minimum, the processing unit causes an engine heat device, such as a block heater, to warm the block.

Still further embodiments of the invention include a number of vehicle sensors which determine whether the vehicle is ready to be started. These sensors include door lock, window shut, parking brake, and transmission sensors. The processing unit monitors these sensors to ensure the vehicle may be safely started, and that the vehicle is not easily stolen once the engine has been started.

For a fuller understanding of the nature and advantages of the invention, reference should be made to the ensuing description taken in conjunction with the accompanying drawings.

DESCRIPTION OF THE PREFERRED EMBODIMENT

Figure 1:
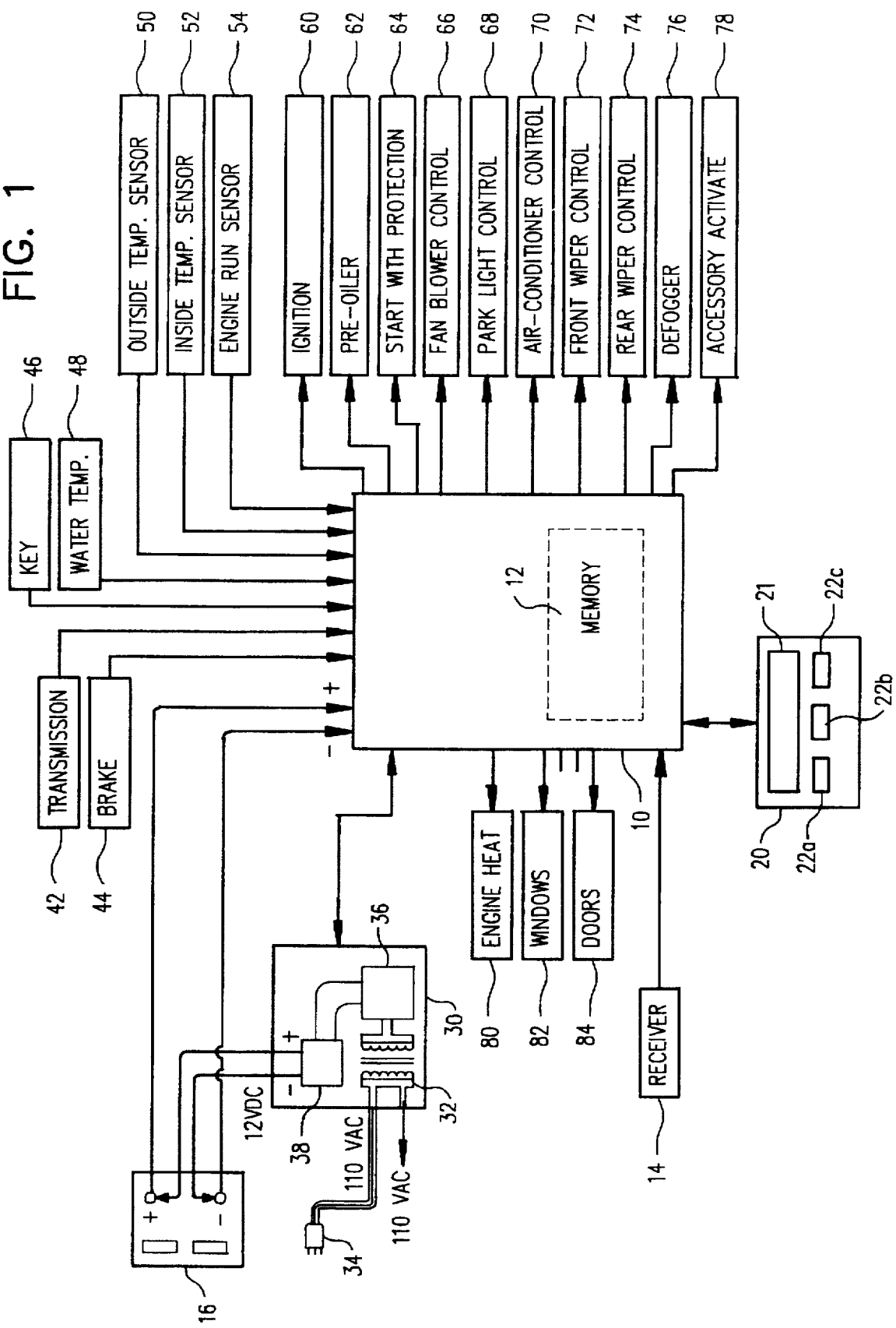
FIG. 1 is a block diagram depicting a remote and programmable system according to an embodiment of the present invention.

Embodiments of the present invention will now be described by first referring to FIG. 1, where one specific embodiment of a remotely programmable heating and cooling system 5 according to the invention is shown. In this specific embodiment, the system 5 is based around a processing unit 10 which has memory 12. Memory 12 stores program code adapted to provide the functionality which will be discussed herein. Memory 12 may be random access memory (RAM), read-only memory (ROM), flash memory, or any other memory which may be accessed from processing unit 10. In one specific embodiment, memory 12 is on-board program and data memory of the processing unit 10, and processing unit 10 is a microcontroller such as the PIC16C74 microcontroller chip from Microchip Technology, Inc.

The processing unit 10 is coupled to receive power from an automobile battery 16. Unit 10 is programmed to operate either remotely, via receiver unit 14, or directly through control unit 20. Control unit 20 may include a display portion 21 and one or more keys 22. Keys 22 are used by a vehicle operator to select operating conditions for the system 5. For example, the keys 22 may be used to select a time by which the vehicle should be warmed up (e.g., a specific time the following morning when the operator will be going to work). Other functions which may be programmed will be apparent upon reading the remainder of this disclosure.

Figure 3:
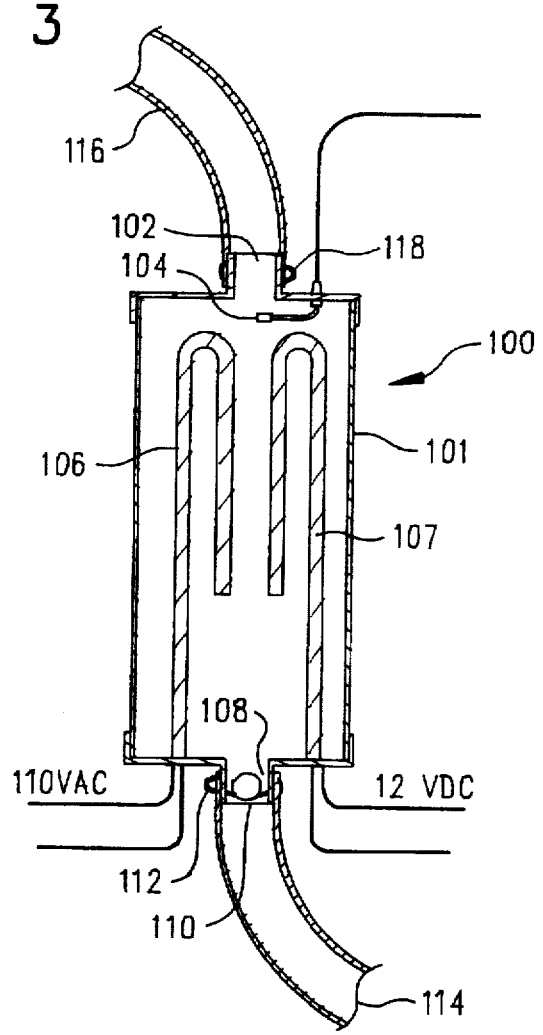
FIG. 3 is an embodiment of a transmitting unit for use with the remote and programmable system of FIG. 1.

Receiver unit 14 may also be employed to program the system 5. In one specific embodiment, receiver unit 14 is a radio-frequency (RF) remote coupled to receive signals from a transmitter unit 90 (FIG. 3). Transmitter unit 90 may be attached, e.g., to the vehicle operator's key ring 92. This unit 90 allows the vehicle operator to control the system 5 from a distance. The unit may include one or more buttons 94, 96 allowing an operator to select functions of the system 5. Signals from the transmitter unit 90 are, in one embodiment, transmitted to the receiver unit 14 via an antenna 98. Those skilled in the art will recognize that a number of types of transmitting and receiver units may be used, including RF units, infra-red units, and the like.

Processing unit 10 is coupled to receive a number of control signals. For example, processing unit 10 may receive control signals (in addition to the control signals from the receiver unit 14 and the control unit 20) from an outside temperature sensor 50, an inside temperature sensor 52, an engine run sensor 54, a transmission sensor 42, brake sensor 44, key sensor 46, and water temperature sensor 48. These control signals are used by processing unit 10 to perform control functions which will be described. Preferably, processing unit 10, under the control of software contained in memory 12, continually monitors the state of each of the control signals. The state of, e.g., the outside temperature or the fact that the parking brake is engaged are used by processing unit 10 to control the remotely programmable heating and cooling system 5 of the present invention in a manner which will be discussed below.

Certain signals, such as the temperature signals from sensors 48, 50, and 52, may be analog or digital signals indicating the magnitude of the measured temperature. Other signals, such as those from the transmission, brake, key, or engine run sensors, may be simple digital signals indicating the assertion or nonassertion of the sensed devices. For example, a logic "one" from the brake sensor unit 44 may indicate that the parking brake is activated. Those skilled in the art will recognize that a number of signal conventions and sensor schemes may be used.

Processing unit 10 is also coupled to control a number of vehicle devices. For example, processing unit 10 may be coupled to control an ignition switch 60, a pre-oiler 62, a start with protection unit 64, a fan blower control circuit 66, parking light control unit 68, air-conditioner control unit 70, front wiper control unit 72, rear wiper control unit 74, defogger circuitry 76, accessory activation circuits 78, engine heat unit 80, windows 82, and doors 84. Each of these vehicle devices are coupled to the processing unit 10 in a way such that they may be activated when selected by the processing unit 10. For example, front wiper control unit 72 may be coupled to a digital output from processing unit 10 via a relay switch. When the digital output is asserted, the relay switch is tripped, causing the front wiper control unit 72 to operate. Operation of the front wiper control unit 72 is halted by deasserting the digital output of the processing unit 10 associated with unit 72. Other vehicle devices may be controlled in a similar manner. For example, start with protection unit 64 may be coupled to control a vehicle alarm system or other start protection devices (e.g., engine cut-off switches or the like).

Control and operation of the remotely programmable heating and cooling system 5 will now be described by referring to the flow diagram of FIG. 2. The system 5 is first programmed in step 1000 to perform selected functions. The system 5 may be programmed through either control unit 20 or through the receiver unit 14. In one specific embodiment, the following functions and options may be programmed: system 5 may be enabled; a start time for the cooling or heating functions may be selected; and, either a cool or a warm start may be selected. Preferably, an operator will program a start time and select either a warm or a cold start using control unit 20. Transmitter unit 90, preferably, is used to remotely enable or disable system 5. For example, transmitter unit 90 may be used to remotely start the system from inside the operator's house to permit system operation to warm or cool the car before the operator leaves the comfort of the house.

For the purposes of discussion, assume that an operator has entered a start time of 9:00 am for a warm start using keys 22a–c on control unit 20. Once the operator has enabled the system, either through control unit 20 or via transmitter unit 90, the system 5 is ready for operation.

If the temperature is very cold, system 5 may cause oil and/or water in the vehicle to be heated to avoid damage to the engine block (step 1020). The system 5 accomplishes this by continually monitoring temperature sensors (step 1020), including checking the water temperature sensor 48, the outside temperature sensor 50. The inside temperature sensor 52 may also be checked. If, for example, the water temperature sensed by sensor 48 falls below 36°–38° F., processing unit 10 may cause an engine heat unit 80 to operate (step 1020). Engine heat unit 80 may be, e.g., a block heater or any other engine heating device known in the art. Alternatively, or in addition, oil in the vehicle's oil pan may be heated (step 1010) by activating a pre-oiler 62. This pre-oiler 62 may be any of a number of pre-oilers known in the art which typically include heat elements positioned within the pan.

Whether or not processing unit 10 determines that heating of oil and/or water is necessary, the unit 10 continually checks to determine whether the programmed start time has been reached (step 1030). Again, in this example, the operator has chosen 9:00 am as the start time. Until that time has been reached, unit 10 continually monitors (step 1035) the temperature to discern if steps need to be taken to heat oil and/or water.

When the unit 10 determines that the programmed start time (e.g., 9:00 am) has been reached (step 1030), several safety and security steps are taken. First, the unit verifies that the doors of the vehicle have been locked. (step 1040). This step is accomplished, in one embodiment, by reasserting a door lock signal on the door unit 84. Next, unit 10 verifies that the windows of the vehicle are shut S (step 1050) by asserting a signal which causes the window unit 84 to shut. Unit 10 then checks to verify that the transmission sensor 42 indicates the transmission is in a condition to start the vehicle (e.g., in neutral or in park) and that the brake sensor 44 indicates the parking brake is set (step 1060). Each of these steps (1040–1060) are performed to put the vehicle in condition to be started.

By verifying that the doors are locked (step 1040) and that the windows are shut (1050), embodiments of the present invention ensure that the vehicle may be started without fear of being stolen once the engine has been started. If any of these conditions cannot be met, the processing unit 10 will not attempt to start the engine. Further, once the engine has been started, embodiments of the invention provide further security by checking whether the parking brake is released or the transmission is engaged. If so, and if no key is sensed by key sensor 46 (indicating an attempted theft), the processing unit 10 causes the engine to stop running.

Once processing unit 10 has verified that each of the prerequisites to starting the engine have been met (e.g., doors locked, windows shut, parking brake engaged, and transmission in neutral or park), the unit asserts an ignition signal 60 to start the engine (step 1070). This signal 60 is repeatedly asserted (step 1080) until the engine has been started. Processing unit 10 verifies whether engine is operating by checking engine run sensor 54 after each attempt to start the engine (step 1070). In one specific embodiment, processing unit 10 will repeat step 1070 up to five times until the engine has started. If the engine does not start after, e.g., five attempts, processing unit 10 ceases further start attempts.

Next, (step 1090), processing unit 10 checks the temperature sensors 48, 50, and/or 52 to determine if the engine has warmed up sufficiently to operate the blower unit 66. In one specific embodiment, processing unit 10 allows the blower unit 66 to function only after the water temperature sensor 48 indicates the temperature of the water is greater than 120°

F. Processing unit 10 continually checks the temperature sensors if the water has not yet reached this temperature. Once the water has reached the proper temperature, processing unit 10 operates the fan blower unit 66 to start the fan blower (step 1100). The processing unit 10 may continually monitor the inside temperature sensor 52 to determine whether the interior of the vehicle has reached a desired temperature.

If the operation selected and programmed in by the operator in step 1000 is a warm start (checked by the unit 10 in step 1110), the processing unit 10 causes the air-conditioner control 70 to operate. The air-conditioner and blower may remain operational until a desired interior temperature is reached (verified by checking inside temperature sensor 52). The vehicle is thus cooled for use by the operator.

If the operation selected by the operator in step 1000 is not a warm start (i.e., is a cold start, as checked by the processing unit 10 in step 1110), the processing unit 10 causes the defogger 76 to operate (step 1130). Defogger 76 may include both a front windshield defog and a rear window defog. The defogger 76 is continually operated (step 1135) for a preselected period of time (e.g., several minutes) to allow the windows to be defrosted. After the preselected period of time has passed, processing unit 10 may assert signals driving the front and rear wiper controls 72, 74 (step 1140), to clean the defrosted windows. The vehicle, thus, is warmed to a preselected temperature and its windows are cleaned and ready for use by the operator at the time selected by the operator. The start operation occurs in a safe and secure manner. Further, in a cold climate, the processing unit 10 has monitored the temperature to ensure the engine is not damaged by cold weather.

Figure 2:
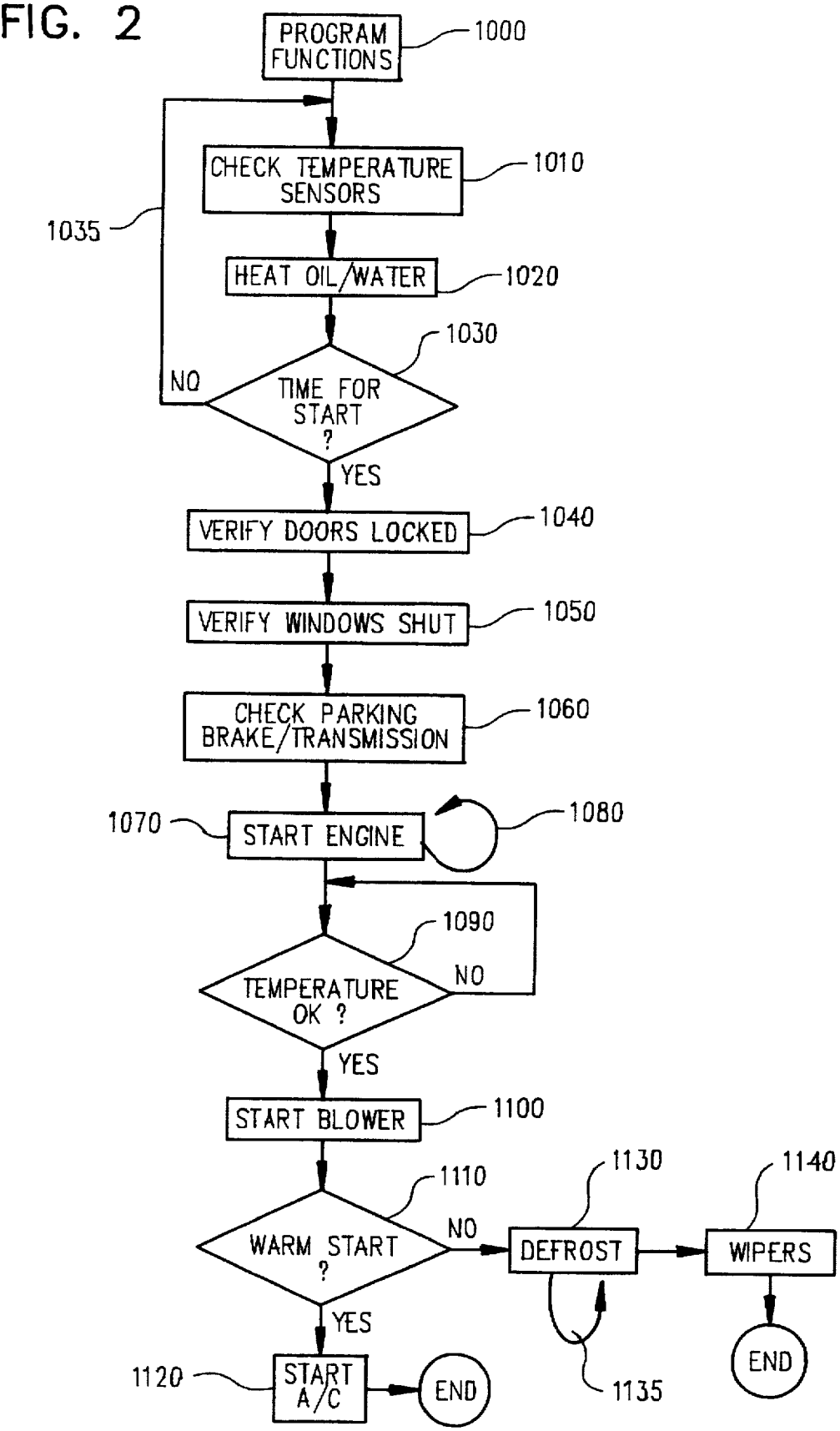
FIG. 2 is a flow diagram depicting operation of the remote and programmable system of FIG. 1.

When the operator enters the vehicle and inserts the key after the start operation of FIG. 2 has occurred, key sensor 40 notifies processing unit 10. Processing unit 10 then enters a waiting or reset state until the operator next programs a function (step 1000). Vehicle operation progresses as normal until control unit 20 or transmitting unit 90 are used to reprogram system 5.

The system 5 of the present invention may be implemented to control other features as well. For example, processing unit 10 may also be coupled to accessories 78, such as a car alarm system or the like. As another example, processing unit 10 may cause park light control 68 to function when the engine is started in step 1070 of FIG. 2.

The remote and programmable heating and cooling system 5 according to the present invention may be easily installed in a vehicle by coupling the unit as shown in FIG. 1. Preferably, control unit 20 is positioned in a location permitting ready access by an operator, such as in the dashboard or under the dashboard of the vehicle.

As shown in FIG. 1, the system 5 may also be configured to receive power from a trickle charger 30 which includes a transformer 32 which has a standard outlet plug 34 attached thereto, a rectifier 36 electrically connected to the transformer 32 and a voltage and current regulator 38 electrically connected to the rectifier 36 and in turn to the car battery 16 of the vehicle.

Figure 4:
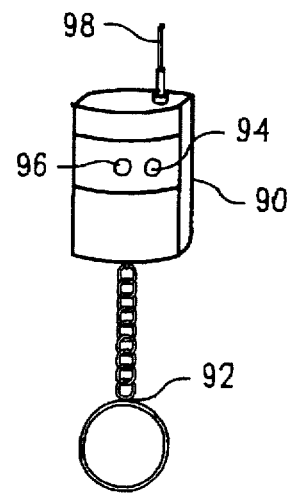
FIG. 4 is an embodiment of an engine heat unit for use with the remote and programmable system of FIG. 1.

Referring briefly to FIG. 4, the engine heat device 80 of system 5 may be formed from a burpulator 100. The burpulator 100 may be located in the engine bay of the vehicle and includes a cylindrical housing 101 having a lower extruded opening 110 and an upper extruded opening 102, a submersible 110 VAC heater element 106 mounted inside the burpulator 100. A submersible 12 VDC heater element 107 may also be mounted inside the burpulator 100. A temperature sensor 104 is mounted inside the burpulator 100 and electrically connected to the processor unit 10. A check valve 108 is located at the lower extruded opening 110 and includes a counter-sunk washer and ball arrangement operating as a fluid valve. A lower heater hose 114 is routed from the engine and connected to the lower extruded opening 110 and secured thereon with a lower hose clamp 112. An upper heater hose 116 connects the upper extruded opening 102 to the heater core of the vehicle. Upper heater hose 116 is coupled to opening 102 via a clamp 118.

The submersible 110 VAC heater element 106 may be electrically connected to the trickle charger 30 and the submersible 12 VDC heater element 107 may be electrically connected to the battery 16 of the vehicle. Regardless of the configuration as described below for the source of electrical power, the water/coolant in the burpulator 100 is heated and, due to the rate at which the processing unit 10 cycles the on-time of the power source, burped or cycled out of the burpulator 100, through the upper heater hose 116 to the heater core of the vehicle. As the water/coolant is heated, the ball floats up from the counter-sunk washer of the valve 108 thereby opening the valve to allow unheated water/coolant from the engine to enter the burpulator 100 through the lower heater hose 114. This cycle is repeated and the engine of the vehicle is heated. As discussed above in conjunction with FIG. 2, the cycle may be repeated until the temperature of the engine is sufficiently above the temperature at which the engine is in danger of freezing. Other engine heat devices 80 known to those skilled in the art may also be used.

As will be appreciated by those familiar with the art, the present invention may be embodied in other specific forms without departing from the spirit or essential characteristics thereof. Accordingly, the disclosure of the invention is intended to be illustrative, but not limiting, of the scope of the invention which is set forth in the following claims.

What is claimed is:

1. A vehicle heating, cooling and safety control system for use in a vehicle having an ignition system, a heating system and a cooling system, the control system comprising:

a processing unit coupled to said ignition system, to said heating system, and to said cooling system;

a parking brake sensor coupled to a parking brake and to said processing unit, adapted to indicate if said parking brake is engaged;

a transmission sensor coupled to a transmission and to said processing unit, adapted to indicate if said transmission is in neutral or park;

a door lock sensor coupled to at least a first door lock and to said processing unit, adapted to indicate if said at least first door lock is engaged; and a window shut sensor coupled to at least a first window and to said processing unit, adapted to indicate if said at least first window is shut;

a memory coupled to said processing unit comprising a computer usable medium having a computer readable program code means embodied therein for directing operation of said vehicle heating and cooling control system, said computer readable program code means including:

computer readable program code means for causing said ignition system to operate at a selected time;

computer readable program code means for causing said heating system to heat said vehicle at said selected time;

computer readable program code means for causing said cooling system to cool said vehicle at said selected time; and computer readable program code means for monitoring said parking brake sensor, transmission sensor, door lock sensor and window shut sensor to verify whether said vehicle is in an operating condition.

2. The vehicle heating and cooling control system of claim 1, further comprising:

a receiver unit coupled to said processing unit; and a remote control unit remotely coupled to said receiver unit, said remote control unit adapted to send control signals to said receiver unit to enable operation of said processing unit.

3. The vehicle heating and cooling control system of claim 1, further comprising a defrost system controlled by said processing unit to defrost windows of said vehicle.

4. The vehicle heating and cooling control system of claim 1, further comprising a windshield wiper controlled by said processing unit to clean windows of said vehicle.

5. A method for automatically warming a vehicle, said vehicle having an engine and a heating system, the method comprising the steps of:

enabling said heating system using a control unit coupled to a processing unit;

selecting, using the control unit a start time to warm said vehicle;

after said enabling step and before said start time repeatedly or continuously monitoring, using said processing unit, at least one temperature sensor until said start time is reached;

verifying, in said processing unit, that said start time has been reached;

prior to starting said engine, ensuring, using said processing unit, that conditions are secure to start said engine by verifying that doors and windows of said vehicle are secured from unauthorized entry, that a parking brake is set and that a transmission is in neutral;

starting said engine;

controlling, using said processing unit, said heating system to warm said vehicle to a preselected temperature.

6. The method of claim 5, wherein said step of monitoring said at least one temperature sensor includes one or more checking steps selected from the group consisting of:

checking, using said processing unit, the state of an engine temperature sensor;

checking, using said processing unit, the state of an inside temperature sensor; and checking, using said processing unit, the state of an outside temperature sensor.

7. The method of claim 5, further comprising the step of activating an engine, water or cabin interior heating device when said at least one temperature sensor indicates a temperature below a preselected minimum temperature.

8. The method of claim 5, including the step of controlling, using said processing unit, said defrost system to defrost windows of said vehicle.

9. The method of claim 8, including the step of controlling, using said processing unit, windshield wipers of said vehicle to clean a windshield of said vehicle.

10. A vehicle heating control system for use in a vehicle having an ignition system and a heating system, the control system comprising:

a processing unit coupled to said ignition system and to said heating system;

a memory coupled to said processing unit comprising a computer usable medium having a computer readable program code means embodied therein for directing operation of said vehicle heating control system, said computer readable program code means including:

computer readable program code means for causing said ignition system to operate at a selected time;

computer readable program code means for causing said heating system to heat said vehicle at said selected time;

a parking brake sensor coupled to a parking brake and to said processing unit, adapted to indicate if said parking brake is engaged;

a transmission sensor coupled to a transmission and to said processing unit, adapted to indicate if said transmission is in neutral or park;

a door lock sensor coupled to at least a first door lock and to said processing unit, adapted to indicate if said at least first door lock is engaged; and a window shut sensor coupled to at least a first window and to said processing unit, adapted to indicate if said at least first window is shut, wherein said computer readable program code means further comprises:

computer readable program code means for monitoring said parking brake sensor, transmission sensor, door lock sensor and window shut sensor to verify whether said vehicle is in an operating condition.

11. The vehicle heating control system of claim 10, further comprising:

a receiver unit coupled to said processing unit; and a remote control unit remotely coupled to said receiver unit, said remote control unit adapted to send control signals to said receiver unit to enable operation of said processing unit.

12. The vehicle heating control system of claim 10, further comprising at least a first temperature sensor and at least a first engine heat device, each coupled to said processing unit, wherein said computer readable program code means further comprises:

computer readable program code means for monitoring said at least first temperature sensor to monitor a temperature of said vehicle; and computer readable program code means for activating said at least first engine heat device when said temperature of said vehicle falls below a preselected minimum temperature.

13. The vehicle heating control system of claim 10, further comprising a defrost system controlled by said processing unit to defrost windows of said vehicle.

14. The vehicle heating control system of claim 10, further comprising a windshield wiper controlled by said processing unit to clean windows of said vehicle.

15. A method for automatically cooling a vehicle, said vehicle having an engine and a cooling system, the method comprising the steps of:

enabling said cooling system using a control unit coupled to a processing unit;

selecting, using the control unit, a start time to cool said vehicle;

after said enabling step and before said start time repeatedly or continuously monitoring, using said processing unit, at least one temperature sensor until said start time is reached;

verifying, in said processing unit, that said start time has been reached;

prior to starting said engine, ensuring, using said processing unit, that conditions are secure to start said engine by verifying that doors and windows of said vehicle are secured from unauthorized entry, that a parking brake is set and that a transmission is in neutral;

starting said engine; and controlling, using said processing unit, said cooling system to cool said vehicle to a preselected temperature.

* * * * *